(12) United States Patent
Anderson (10) Patent No.: US 12,355,133 B2
(45) Date of Patent: Jul. 8, 2025

(54) RELEASABLE MAGNETIC ANTENNA MOUNT WITH ANTI-ROTATION FEATURE

(71) Applicant: Andrew Anderson, Hesperia, CA (US)

(72) Inventor: Andrew Anderson, Hesperia, CA (US)

(73) Assignee: Tolemar, LLC, Huntington Beach, CA (US)

( * ) Notice: Subject to any disclaimer, the term of this patent is extended or adjusted under 35 U.S.C. 154(b) by 1198 days.

(21) Appl. No.: 16/273,018

(22) Filed: Feb. 11, 2019

(65) Prior Publication Data
US 2019/0251881 A1 Aug. 15, 2019

Related U.S. Application Data

(60) Provisional application No. 62/629,586, filed on Feb. 12, 2018.

(51) Int. Cl.
| | |
|---|---|
| *H01Q 1/08* | (2006.01) |
| *B60R 13/00* | (2006.01) |
| *G09F 7/18* | (2006.01) |
| *G09F 17/00* | (2006.01) |
| *H01Q 1/27* | (2006.01) |

(52) U.S. Cl.
CPC ............ *H01Q 1/088* (2013.01); *B60R 13/00* (2013.01); *G09F 7/18* (2013.01); *G09F 17/00* (2013.01); *H01Q 1/27* (2013.01); *G09F 2017/005* (2013.01); *G09F 2017/0075* (2013.01)

(58) Field of Classification Search
CPC . H01Q 1/088; H01Q 1/27; H01Q 1/32; B60R 13/00; G09F 7/18; G09F 17/00; G09F 2017/005; G09F 2017/0075
See application file for complete search history.

(56) References Cited

U.S. PATENT DOCUMENTS

| | | | | |
|---|---|---|---|---|
| 3,148,856 A | * | 9/1964 | Orlando | G09F 17/00 248/205.6 |
| 3,241,516 A | * | 3/1966 | Hopkins | H01F 7/0252 116/173 |
| 3,245,165 A | * | 4/1966 | Podoloff | G09F 7/18 248/467 |
| 4,422,137 A | * | 12/1983 | Watts | F21V 21/02 362/147 |
| 4,574,726 A | * | 3/1986 | Sullivan | B60R 13/005 116/28 R |
| 4,700,655 A | * | 10/1987 | Kirby | G09F 21/042 116/28 R |

(Continued)

*Primary Examiner* — Kristina M Deherrera
*Assistant Examiner* — Tania Courson
(74) *Attorney, Agent, or Firm* — Andrew S. Dallmann, P.C.

(57) ABSTRACT

The assembly disclosed herein is to attach a mast used by an off-road vehicle to the off-road vehicle itself using a mount assembly and a base assembly. The mount assembly is formed for the most part from non-magnetic materials is attached to an off-road vehicle by a ferromagnetic bolt at its proximal end. The base assembly is inserted into the mount assembly's open distal end the base assembly having a magnet attached to its proximal end that attracts the ferromagnetic bolt in the mount assembly and an opening at its distal end to receive an adapter that is connected to a mast. The proximal end of the base assembly having a surface effect that is received by the ferromagnetic bolt to prevent base assembly from rotating within the mount assembly.

1 Claim, 7 Drawing Sheets

(56) References Cited

U.S. PATENT DOCUMENTS

| | | | |
|---|---|---|---|
| 4,750,450 A * | 6/1988 | Wiegand | E01F 9/688 |
| | | | 116/173 |
| 6,378,453 B1 | 4/2002 | Conway | |
| 6,637,718 B2 | 10/2003 | Wilson | |
| 6,682,106 B2 * | 1/2004 | Parker | F16L 37/23 |
| | | | 285/317 |
| 6,892,486 B2 * | 5/2005 | Haggard, Jr. | G09F 21/042 |
| | | | 40/604 |
| 7,083,120 B2 * | 8/2006 | Gilpatrick | F16L 37/23 |
| | | | 239/526 |
| 7,367,700 B2 | 5/2008 | Chasmar | |
| 9,368,050 B2 * | 6/2016 | Bigham | G09F 17/00 |
| 10,147,342 B2 * | 12/2018 | Gogatz | G09F 17/00 |
| 11,228,083 B2 * | 1/2022 | Stehlik | H01Q 1/20 |
| 11,605,318 B2 * | 3/2023 | Alton | G09F 21/04 |
| 2005/0178033 A1 * | 8/2005 | Elmer | G09F 7/04 |
| | | | 40/591 |
| 2006/0156600 A1 | 7/2006 | Barker | |
| 2007/0283877 A1 | 12/2007 | Durkin | |
| 2008/0315581 A1 * | 12/2008 | White | F16L 37/22 |
| | | | 285/308 |
| 2013/0113680 A1 * | 5/2013 | Nemeth, III | H01Q 1/42 |
| | | | 343/872 |
| 2013/0186494 A1 * | 7/2013 | Geisel | F16L 37/23 |
| | | | 137/798 |
| 2014/0062814 A1 * | 3/2014 | Gyenes | H01Q 21/30 |
| | | | 343/745 |
| 2014/0116533 A1 * | 5/2014 | Edler | F16L 37/23 |
| | | | 137/315.01 |
| 2015/0033604 A1 * | 2/2015 | Bigham | G09F 17/00 |
| | | | 40/591 |
| 2016/0138744 A1 * | 5/2016 | Polgati | F16L 27/0828 |
| | | | 29/898.064 |
| 2020/0328494 A1 * | 10/2020 | Stehlik | H01Q 1/085 |
| 2021/0248937 A1 * | 8/2021 | Alton | G09F 13/22 |

* cited by examiner

RELEASABLE MAGNETIC ANTENNA MOUNT WITH ANTI-ROTATION FEATURE

CROSS-REFERENCE TO RELATED APPLICATIONS

This application claims priority from U.S. Provisional Patent Application No. 62/629,586 filed on Feb. 12, 2018, titled "Quick Connect & Release Antenna Magnetic Mount." The entire disclosure of the prior application is considered to be part of the disclosure of the accompanying application and is hereby incorporated by reference.

BACKGROUND OF THE INVENTION

1. Field of the Invention

The present invention relates to a connection system for use in joining a safety whip mast to an off-road vehicle so that the safety whip mast may be quickly coupled and uncoupled to the off-road vehicle and does not allow the safety whip mast to rotate about its longitudinal axis.

2. Description of the Related Art

Individuals who enjoy the outdoor sport of "off-roading" often attach a mast to their off-road vehicle that extends well above their vehicle to allow others, who may be nearby, to know the whereabouts of their location. The use of a mast extending above their vehicles to denote their presence promotes the safety of the driver and passengers of the off-road vehicle during the day by attaching a brightly colored flag or pennant to the top of the mast or during the night by attaching to the mast an array of light emitting diodes (LEDs) that is powered by electrical energy supplied by the off-road vehicle or a battery.

Although beneficial as a means for quick identification of the presence of an off-road vehicle, the mast does create a problem in that they break. Although masts are to a great degree flexible, they must extend some height above the off-road vehicle to give the off-road vehicle some degree of visibility. As such, masts are subject to shearing forces when the off-road vehicle is driven underneath rock outcroppings or trees as well as when driving by bushes. These forces may cause the mast to snap and require a replacement mast to be attached to the off-road vehicle. Attachment of a replacement mast must be done quickly to allow the participants to return back to the sport of off-roading and with minimal to no tooling as the locale is very likely to be remote. Quick connect type of couplers are ideal for such a situation and provides the added benefits of easily removing the mast when transporting the off-road vehicle or transferring a mast from one off-road vehicle to another. Another problem facing the driver of the off-road vehicle is that due to the constant vibrations present when driving on uneven surfaces, the mast will rotate within the coupler and may become unplugged from its power source.

Quick connect couplers are basically comprised of two components. The first component is a cylindrically shaped mount while the second component is a cylindrically shaped base that is inserted into the mount. At one end of the mount is found a means of attaching the mount to a point on the frame of the off-road vehicle. Typically, the mount has at one end a threaded bolt that passes through a hole in the frame of the off-road vehicle and secured to the off-road vehicle by a nut. At the opposing end of the mount is an opening that receives the base and employees a ball-lock system to lock the base into the mount. As for the base, an end containing a groove about its circumference is inserted into the mount while the opposite end is open to receive a mast. For a ball-lock system the mount has one or more holes about the opening. These holes are covered by a spring-loaded sleeve and within each hole is a ball. The holes are tapered or stepped to reduce their diameter at the opening so the balls do not fall into the opening but partially protrude into the opening when the spring-loaded sleeve is in its normal closed position. It is not possible to insert the base when the spring-loaded sleeve is in its closed position. When pulling back on the spring-loaded sleeve the wall becomes thinner thereby increasing the gap between the ball and the wall of the spring-loaded sleeve so that the ball may roll into this gap and no longer protrude into the opening. Once the spring-loaded sleeve has been pulled back the base may be inserted into the opening deep enough so that the groove present on the base is opposite the one or more holes. Releasing the spring-loaded sleeve back to its normally closed position caused the balls to protrude back into the opening and into the groove present on the base. At this point the base is locked into the mount and may not be removed until the spring-loaded sleeve is pulled back to allow the balls to roll away from the opening.

There are many patents that relate to quick coupling devices. US patent publication 2013/0186494 discloses a quick connect coupler that cuts the flow from the mount to the base when a certain temperature is reached. US patent publication 2016/0138744 discloses a quick connector coupler with a design that simplifies the manufacturing and cleaning of the mount. US patent publication 2014/0116533 discloses a quick connect coupler where the mount is capable of forming a connection with a variety of bases thus being called a "universal" coupler. While each of these quick coupling devices, as well as many others, allow the mount and the base to quickly connect or to be disconnected they have a problem in that groove present on the base allows the base to rotate. In a rugged environment such as off-roading, the base will rotate about its longitudinal axis due to the extensive amount of vibration present while the off-road vehicle travels over the terrain. When the base rotates so will the mast rotate and will eventually start pulling on the electrical connectors supplying power to the array of LEDs and could cause a breakage in the electrical connector resulting in the array of LEDs failing to light.

Various patents have disclosed inventive concepts that prevent the base from rotating about its longitudinal axis. U.S. Pat. No. 6,682,106 addresses this problem by adding anti-rotation flats on the base that engage with anti-rotation tabs on the mount. Thus, when the base has been properly connected to the body coupler the base will not rotate independently of the body coupler. US patent publication 2008/0315581 discloses a base with one or more ridges present in the groove that prevent further rotation of base once a ridge comes up against a ball from the body coupler that protrudes within the opening that receives the base. U.S. Pat. No. 7,083,120 discloses a spring-loaded sleeve where the opening through which the base is inserted is hexagonal in shape to engage with a hexagonal surface present on the base. When the base has been connected to the body coupler the base is prevented from rotating due to the engagement of the hexagonal surface of the base and the hexagonal opening in the spring-loaded sleeve. While these patents and publications do prevent the base from rotating they require that both the body coupler and the base be of special manufacture. It would be preferred that only the base be of special manufacture but still be able to utilize off the shelf body couplers. US patent publication 2008/0315581 achieves this goal by only requiring that the base, having ridges in the groove, be of special manufacture. However, adding ridges to the groove is a delicate process and additional balls in the body coupler are needed to minimize the amount of rotational travel allowed by the base.

Known systems do not provide a means to quickly couple and uncouple a mast to an off-road vehicle while at the same time preventing the mast from rotating as the off-road vehicle is driven over uneven roads.

BRIEF SUMMARY OF THE INVENTION

The present invention consists of mount that attaches to the frame of an off-road vehicle and a base that is inserted into the mount.

The mount is cylindrical, hollow, and is formed of a material that does not exhibit any magnetic properties. The proximal end, or bottom, of the mount is to be attached to the off-road vehicle while the distal end, or top, is open to receive the base. Found at the bottom of the mount is a threaded hole that allows for the passage of a similarly threaded bolt through the bottom of the mount, the bolt having magnetic properties. The exposed end of the bolt then passes through a hole in the off-road vehicle where the mast is to be located and is secured to the off-road vehicle by threading a nut onto the bolt from the opposing side of the hole in the off-road vehicle. The nut used may be a locknut; also known as a lock nut, locking nut, prevailing torque nut, stiff nut, or elastic stop nut in the industry; or a lock washer may be used to prevent the nut from loosening due to vibrations present when the off-road vehicle is in motion.

The base is also cylindrical and is formed of a material that does not exhibit any magnetic properties but unlike the mount has an internal structure. The proximal end, or bottom, of the base is to be inserted into the mount while the distal end, or top, is open to receive the mast that is to be supported. The base is sized to closely fit into the mount so that some degree of vacuum is present to resist the quick removal of the base from the mount and create a satisfying "pop" when the base is removed from the mount. At the bottom of the base a cavity is found where a magnet, containing a hole that allows for the passage of a bolt, may be inserted into. At the top of the base a cavity is found where the bottom of the mast is to be inserted. Connecting the two cavities is a threaded channel. The magnet is secured to the base by passing a bolt through the hole in the magnet and threading the bolt into the channel. The mast may be secured to the base either by a friction fit or, by using a longer bolt for securing the magnet, by threading the mast onto the same bolt used to secure the magnet.

It is desirable to prevent the base from rotating within the mount while the off-road vehicle is in motion. Rotation of the base will also rotate the mast that is attached to the base. If the mast contains a light source such as light emitting diodes ("LEDs"), the connection between the power source and the light source may be broken or become tangled together. To prevent the base from rotating within the mount the head of the bolt used to secure the magnet may be of a shape that may be received by the head of the bolt used to secure the mount to the off-road vehicle. For example, the head of the bolt used to secure the magnet to the base may be hexagonal while the head of the bolt used to secure the mount to the off-road vehicle may have a hexagonal cavity to receive the hexagonal head of the bolt used to secure the magnet to the base. As the bolt used to secure the mount to the off-road vehicle does not rotate by means of the locknut or lock washer being used; so the base will not rotate.

It is an object of the present invention to create a vacuum between the mount and the base when the base is being quickly removed from the mount so that a satisfying "pop" sound is produced.

It is another object of the present invention to connect magnetically the mount and the base by using a magnet present on the base and the bolt used to secure the mount to the off-road vehicle.

It is another object of the present invention to prevent the rotation of the base while the off-road vehicle is in motion by interlocking the head of the bolt used to secure the magnet to the base with the head of the bolt being used to secure the mount to the off-road vehicle.

Wrap up with the following: Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

Neither this summary nor the following detailed description defines or limits the invention. The invention is defined by the claims.

BRIEF DESCRIPTION OF DRAWINGS

The present invention will become more fully understood from the detailed description and accompanying drawings, wherein.

DETAILED DESCRIPTION OF THE INVENTION

The following description of the preferred embodiment(s) is merely exemplary in nature and is in no way intended to limit the invention, its application, or uses.

The present invention is for an assembly that may be used to releasably attached a mast to an off-road vehicle. The mast may be a radio antenna, whip to hold a flag or pennant, or a shaft containing an array of light emitting diodes ("LEDs"). The present invention consists of two major components, a mount and a base. The mount is securely attached to the off-road vehicle and the mast is securely attached to the base. The mount and the base are releasably attached to each other either by a vacuum or a magnetic connection or by both a vacuum and a magnetic connection. If the existing mast needs to be replaced because of mechanical or electrical defect, the mast may be easily removed by breaking the vacuum and/or magnetic connection between the mount and the base. A new working mast that is attached to a base may then be inserted into the mount and secured to the mount by a vacuum and/or magnetic connection.

Figure 1:
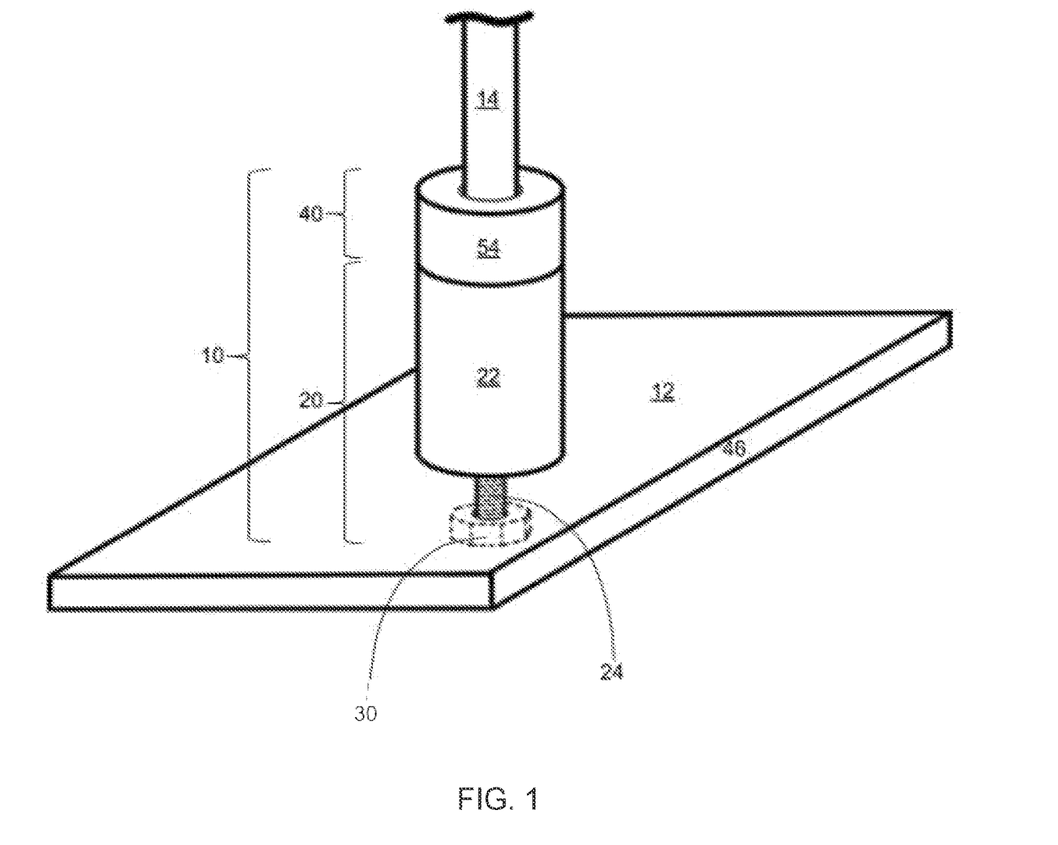
FIG. 1 shows the assembly of the present invention as attached to a panel.
Figure 7:
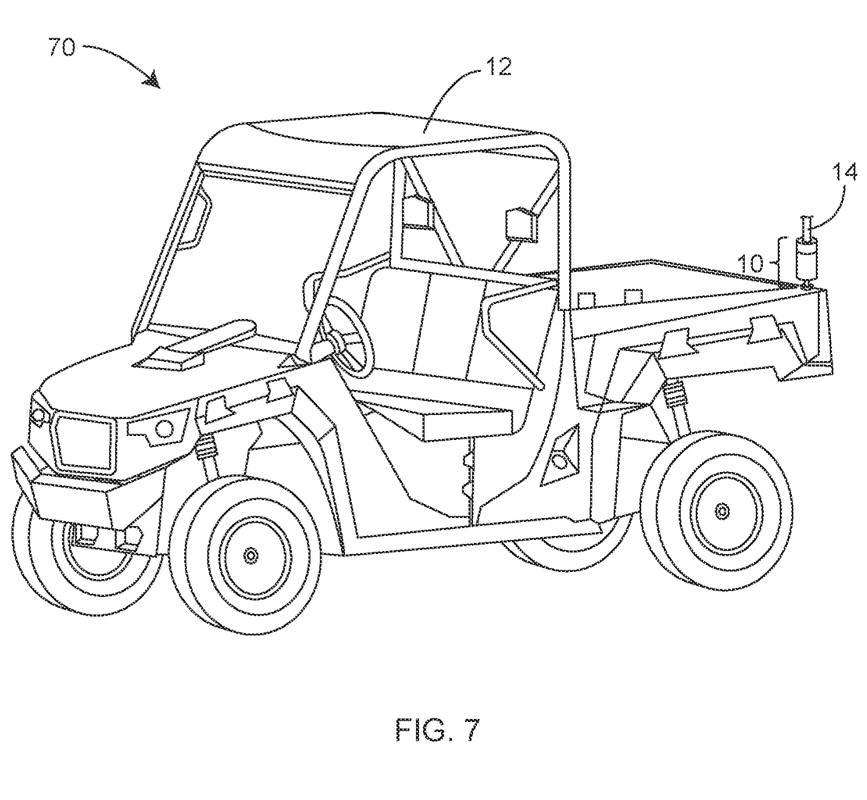
FIG. 7 shows the assembly of the present invention as attached to an off-road vehicle.

FIG. 1 shows assembly 10 of the present invention attached to panel 12 of an off-road vehicle 70 (as shown in FIG. 7). Above panel 12 is found mount assembly 20 with base assembly 40 inserted within with only adapter 54 being visible. Visible in FIG. 1, as part of mount assembly 20, is casing 22, the threaded portion of bolt 24, and nut 30. Visible in FIG. 1 as part of base assembly 40 is solely adapter 54. Base assembly 40 forms a close fit with casing 22 thus creating, to a certain degree, a vacuum fit with mount assembly 20. Base assembly 40 also contains a magnet so that a magnetic connection may be formed between base assembly 40 and mount assembly 20. Mast 14 is inserted into adapter 54 and secured to adapter 54 by friction fit or by an adhesive. Mount assembly 20 contains bolt 24 that passes through panel 12 and is secured to panel 12 by nut 30. A washer and/or lockwasher may be interposed between nut 24 and panel 12 strengthen the attachment between mount assembly 20 and panel 12.

Figure 2:
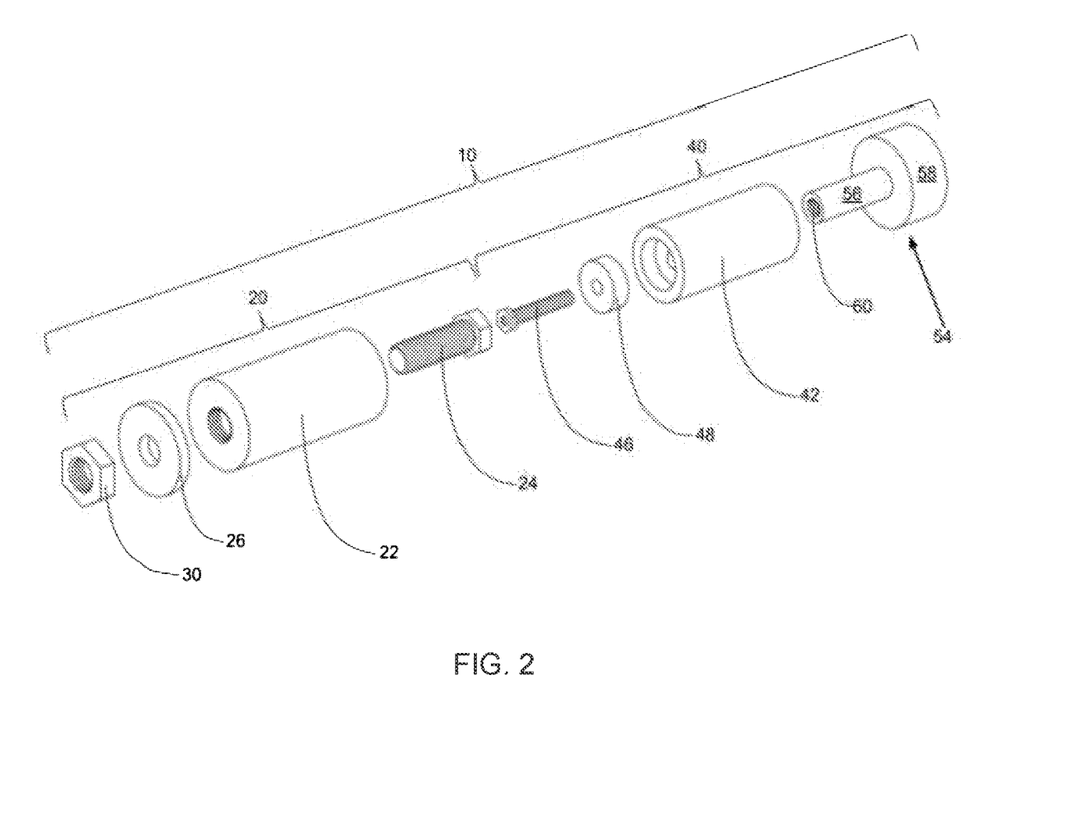
FIG. 2 shows an exploded view of the present invention.

FIG. 2 shows an exploded view of assembly 10 that comprises mount assembly 20 and base assembly 40.

The main component of mount assembly is casing 22 which is cylindrical, hollow, and fabricated from materials that are nonmagnetic. The bottom of casing 22 has within it a threaded hole whereby bolt 24 may be threaded therethrough. Alternate embodiments of casing 22 may dispense with the threading for bolt 24. The threaded portion of bolt 24 extends beyond the bottom of casing 22 so that it may pass through a hole in the panel of the off-road vehicle 70. Nut 30, along with washer 26, then secures casing 22 to the off-road vehicle by threading nut 30 from the opposing side of the hole. Nut 30 may be in the form of a lock nut or a lockwasher may be used in combination with washer 26 to prevent nut 30 from loosening due to vibratory action present while the off-road vehicle 70 is in motion.

Figure 3:
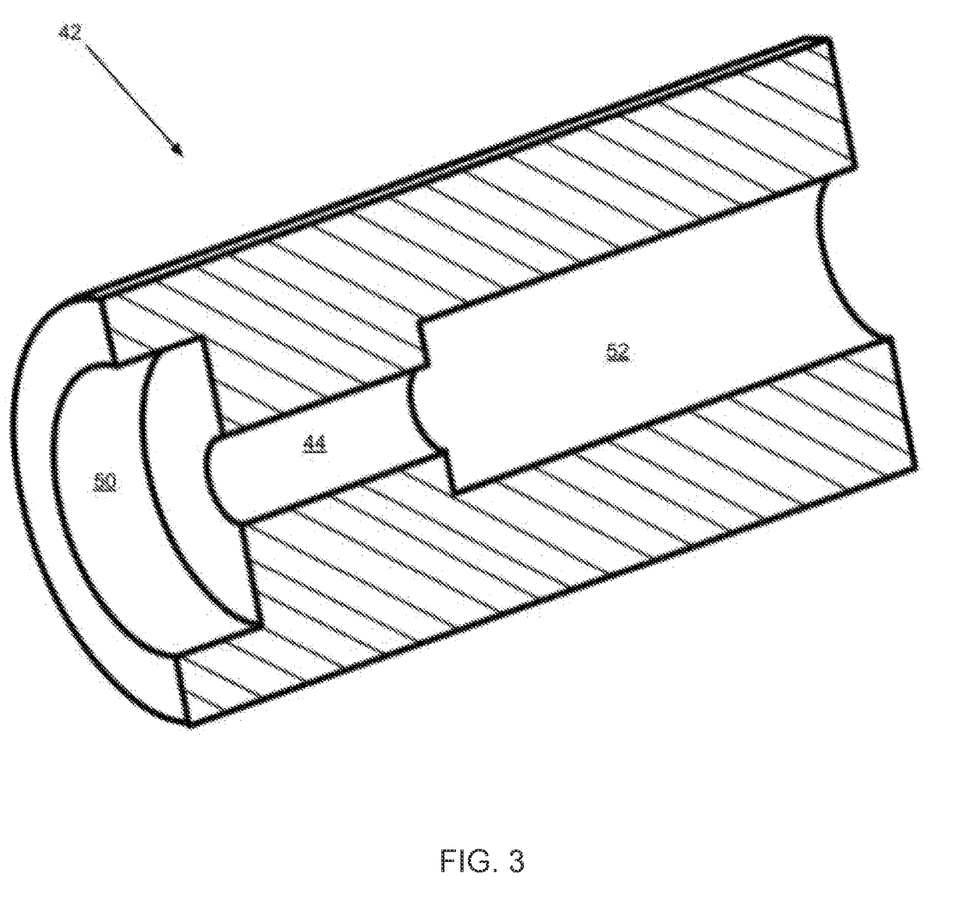
FIG. 3 shows a sectional view of the preferred embodiment of the cylinder within the base assembly of the present invention.
Figure 4:
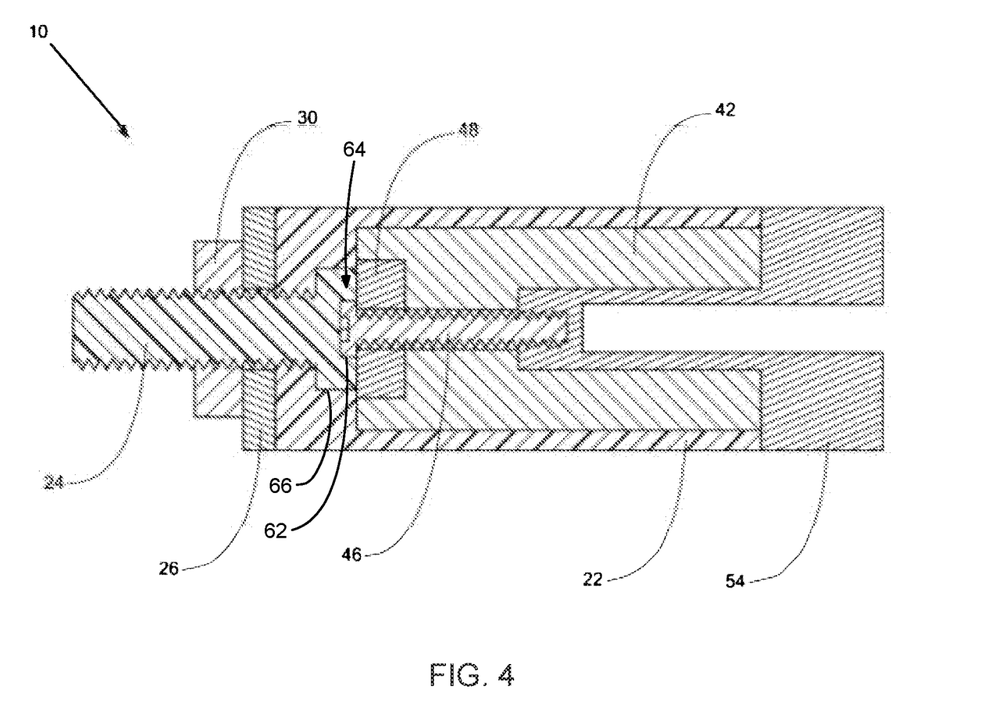
FIG. 4 shows a sectional view of the preferred embodiment of the present invention.

The main component of base assembly 40 is cylinder 42. Cylinder 42 is fabricated from materials that are nonmagnetic with an outer diameter that is slightly less than the inner diameter of casing 22 creating a "pop" sound when cylinder 42 is quickly removed from casing 22. Cylinder 42 further contains two inner cylindrical cavities along and about its longitudinal axis as shown in FIG. 3. First cavity 50, at the bottom, receives magnet 48 and second cavity 52, at the top, receives adapter 54. Between these two cavities and connecting them is channel 44. Magnet 48 has at its center a hole to allow for passage of screw 46. Adapter 54 is comprised of lower shaft portion 56 and upper receiver portion 58. Shaft portion 56 has at its bottom tapped hole 60 with threading that matches the threading of screw 46. Screw 46 will secure magnet 48 and adapter 54 to cylinder 42 by passing through the hole in magnet 48 and channel 44 and then being threaded into tapped hole 60. An adhesive coating may be applied to the threaded portion of screw 46 to prevent screw 46 from loosening due to vibratory forces present when the off-road vehicle 70 is on motion. FIG. 4 shows a sectional view of assembly 10 taken along the longitudinal axis of assembly 10. Assembly 10 is symmetrical along its longitudinal axis. To prevent base assembly 40 from rotating while the off-road vehicle 70 is in motion, the head 62 of the screw 46 should be of a size and shape to fit into a recess 64 in the head 66 of the bolt 24 as bolt 24 will not rotate due to being secured by nut 30. The head 62 of the screw 46 typically would be hexagon as shown in FIG. 2. Other head shapes, such as triangular, rectangular, or some other multi-sided shape, will also function to prevent base assembly 40 from rotating while the off-road vehicle 70 is in motion. For example, the head 62 of the screw 46 may be in the shape of a hexagon that will be received by a recess 64 in the head of bolt 24 that is also in the shape of a hexagon.

Figure 5:
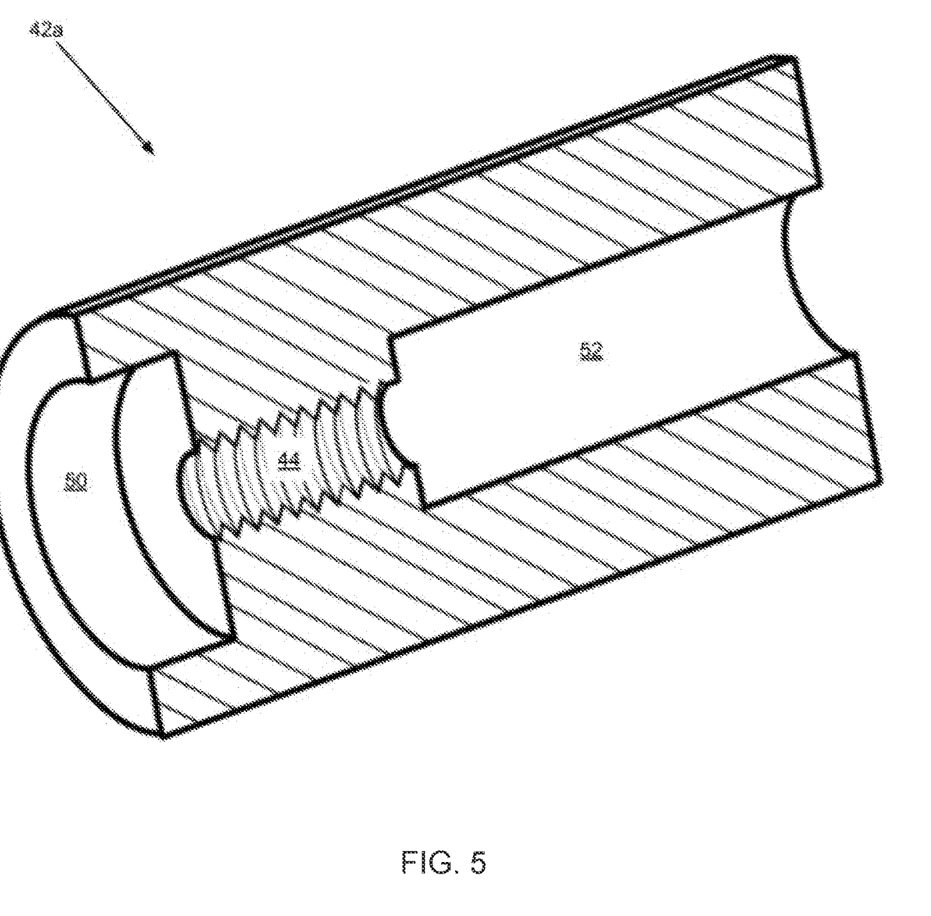
FIG. 5 shows a sectional view of an alternate embodiment of the cylinder within the base assembly of the present invention.
Figure 6:
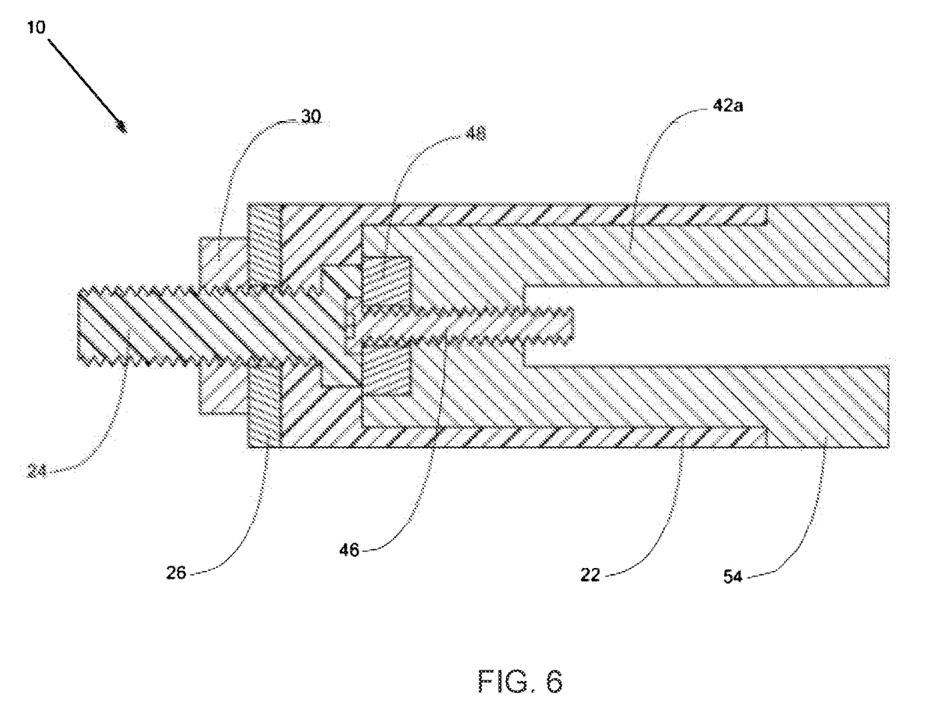
FIG. 6 shows a sectional view of an alternate embodiment of the present invention.

FIG. 5 shows an alternate embodiment of assembly 10 wherein cylinder 42 and adapter 54 are combined into a single component-cylinder 42a. In this embodiment magnet 48 is secured to cylinder 42a by threading screw 46 into tapped channel 44 while mast 14 is inserted into second cavity 52. FIG. 6 shows a sectional view of assembly 10 with cylinder 42a.

Thus, there has been shown and described an embodiment of a novel quick-disconnect assembly 10 for use by off-road vehicles to attach a mast to the frame of the off-road vehicle 70 (as shown in FIG. 7). As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims.

What is claimed is:

1. An assembly to connect a mast to an off-road vehicle, the assembly comprising:
   a mount assembly comprising:
      a casing being cylindrical, hollow, formed from non-magnetic materials, closed at its proximal end except for a circular opening, and open at its distal end; and
      a bolt, formed from ferromagnetic material, that passes through said circular opening of said casing to secure said mount assembly to said off-road vehicle; and
   a base assembly comprising:
      a cylinder formed from non-magnetic materials and of a diameter less than the inner diameter of said casing with a first cavity at its proximal end and a second cavity at its distal end, and a channel connecting said first and second cavities;
      a magnet sized to fit into said first cavity and having a passage in its center;
      an adapter sized to fit into said second cavity having a tapped hole in its proximal end and an opening to receive the mast at its distal end; and
      a screw that passes through said passage and said channel to mate with said tapped hole in said adapter;
   the proximal end of said base assembly insertable into distal end of said mount assembly to releasably couple the two assemblies by a magnetic connection between said magnet and said bolt;
   wherein a head of the screw is configured with a size and shape adapted to fit within a recess formed in a head of said bolt, preventing rotation of the base assembly thereby.

* * * * *